Jan. 30, 1923.
LE ROY E. JOLLS.
GRINDING MACHINE.
FILED JUNE 20, 1918.
1,443,415.
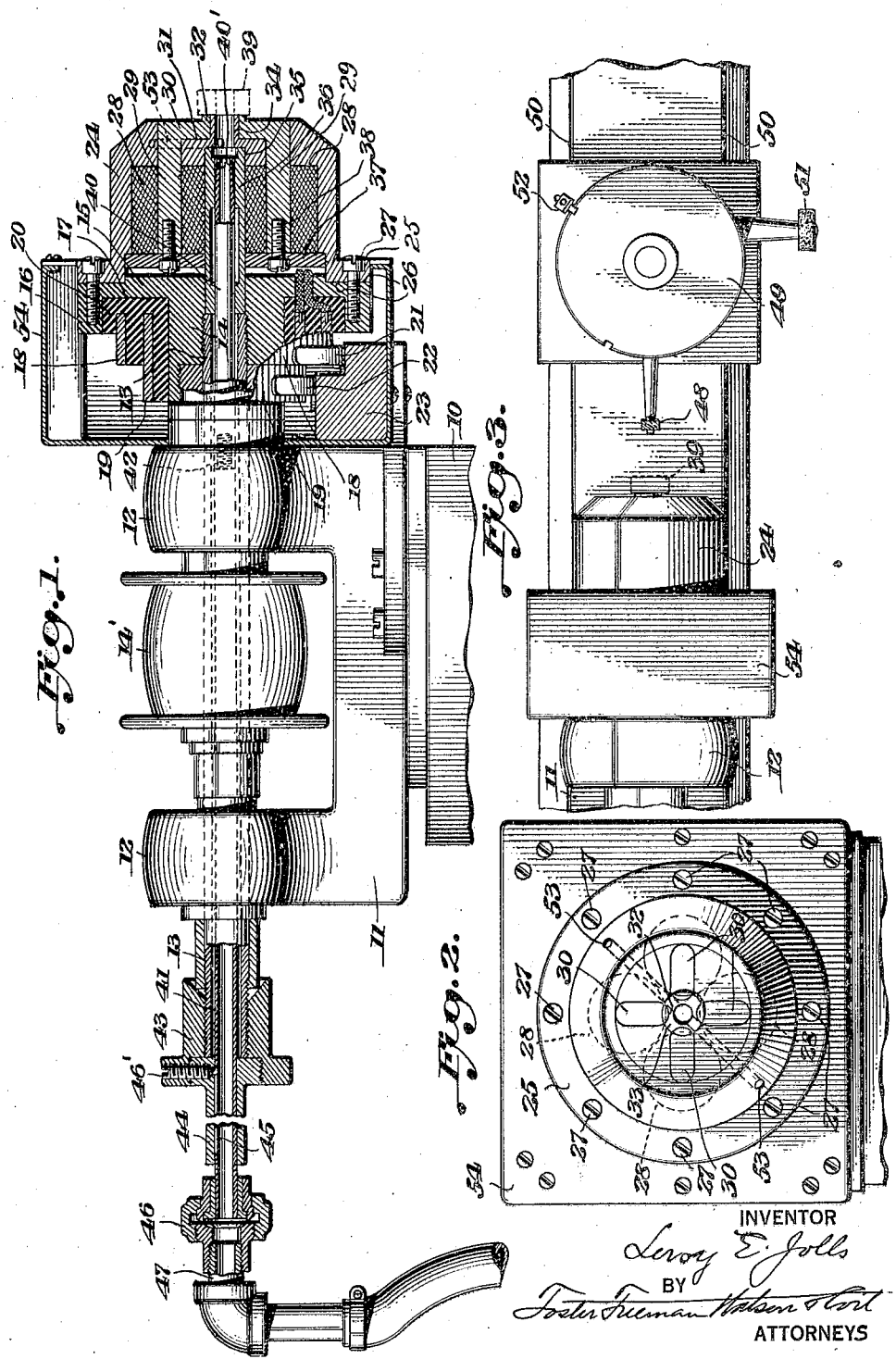
INVENTOR
Leroy E. Jolls
BY
Foster Freeman Watson Stort
ATTORNEYS Patented Jan. 30, 1923.

1,443,415

UNITED STATES PATENT OFFICE.

LE ROY E. JOLLS, OF ELIZABETH, NEW JERSEY, ASSIGNOR TO PACKARD MOTOR CAR COMPANY, OF DETROIT, MICHIGAN, A CORPORATION OF MICHIGAN.

GRINDING MACHINE.

Application filed June 20, 1918. Serial No. 241,041.

*To all whom it may concern:*

Be it known that I, LE ROY E. JOLLS, a citizen of the United States, and resident of Elizabeth, Union county, State of New Jersey, have invented certain new and useful Improvements in Grinding Machines, of which the following is a specification.

The present invention relates to an apparatus for grinding one or both of the peripheral surfaces of a ring so that they will be truly concentric with the axis of the ring and the axis truly perpendicular to the side faces of the ring. To this end the invention consists in placing the ring with a side thereof against a rotatable member having a flat surface perpendicular to the axis of rotation, centering the ring on said flat surface, holding the ring in its centered position, rotating the member and machining one of the peripheral surfaces of the ring by a tool movable perpendicularly to the said flat surface.

The objects and novel features of the invention will be apparent from the description taken in connection with the drawings, in which, Fig. 1 is a side elevation of a metal working machine constructed in accordance with the present invention certain parts being shown in section, the tool holder being omitted;

Fig. 2 is an end elevation of the magnetic chuck and casing surrounding the same;

Fig. 3 is a plan view of a part of the machine.

Referring to the drawings which illustrate the present preferred form of the invention the reference numeral 10 indicates a support which carries a bracket 11 having the upwardly projecting spaced bearing arms 12. The tube 13 is rotatively mounted in the bearing arms and projects from the outer side of either of said bearing arms. A driving pulley 14' is arranged between the bearing arms and mounted on the tube 13 being connected to rotate therewith in any suitable manner. The right hand end of the tube 13 as shown in Fig. 1 is threaded and carries a magnetic chuck, which comprises a disk 15 having a hub 14 screwed on said threaded end, the outer periphery of the disk having the axially extending flange 16 which with the hub 14 forms an annular recess 17. Conductor rings 18 and 19 are arranged as shown and insulated from each other by the insulating material 20 filling the recess 17. Spring contact brushes 21 and 22 connected with a source of electricity are in electric contact with the rings 18 and 19 respectively, these brushes being supported on a block 23. As this construction of brushes is well known it is not necessary to describe or illustrate the same in detail.

A cup shaped member 24 has a peripheral flange or lip 25 which is secured against the annular seat 26 in the face of the disk 15 by means of the cap screws 27. A circularly arranged series of coils 28 are located within the member 24, four coils being shown in the present embodiment of the invention. Each coil has a core 29 which as shown in Fig. 1 is L shaped in cross section, the base 30 of the L being set in a recess 31 in the base or face of the cup shaped member 24 so that it is flush with the said face. At the tip of the base the L shaped core has a lip 32 which together with a projecting portion on the member 24, form a boss 33, the front or end face of this boss being finished so that it is in a plane truly perpendicular to the axis of rotation of the chuck. The base of the member 24 is formed with the bore 34 and the counter bore 35, a sleeve 36 being interposed between the end of the tube 13 and the base of the member 24 and having one end seated in said counter bore. An annular disk 37 having contact with the member 24 and the sleeve 36 is secured to the end of the cores 29 in magnetic contact therewith by means such as the cap screws 38. Thus the coils 28 and cores 29 are securely held against displacement and an arrangement of parts is provided which forms a closed metallic magnetic circuit with the cores 29. A sheet metal casing 54 is arranged around the portion of the chuck between the bearing 12 and the flange 25.

As previously stated one of the principal objects of the present invention is to provide a machine for finishing the bore and periphery of a ring or roller such as shown in dotted lines at 39 so that the axis thereof will be truly perpendicular to a side face of the roller. As the face of the boss 33 which may be termed the face of the chuck is truly perpendicular to the axis of rotation, a roller positioned as shown in Fig. 1, will of course have its side face whch is in contact with the face of the chuck also truly perpendicular to the axis of rotation of the chuck. In order to arrange the roller 39 so that its axis will be coaxial with the axis of rotation of the chuck, a centering pin or spindle 40 is slidingly mounted in the sleeve 36 so that it may be projected from the face of the chuck to engage the bore of a roller 39, thereby centering the roller with respect to the axis of the chuck. In order to aid in properly positioning the roller the end of the centering pin 40 is slightly tapered as shown at 40'. After the roller has been centered by the projecting pin, the latter is retracted to the position shown in Fig. 1. For the purpose of operating the centering pin, which is hollow, that is in the form of a tube, it is connected to a tube 41 by means such as the nipple 42, the tube 41 extending through the tube 13 and projecting from the left end thereof, as shown in Fig. 1. As the outer end of the centering pin is subjected to more more or less wear, and this end must be of absolutely correct size, the pin is made separable from the tube 41 so that it may be replaced when necessary. The left end of tube 13 is threaded and has a flanged sleeve 43 screwed thereon which carries a tubular extension 44, the tube 41 being slidingly mounted in this extension 44. The tube 41 and centering pin 40 thus form a continuous tubular member, having supporting bearings at its ends in the extension 44 and sleeve 36. In order to limit the sliding movement of the centering pin 40, the tube 41 is formed with the slot 45 and the sleeve 43 has a set screw 46' extending through both sleeve 43 and extension 44, the reduced end of the set screw projecting into said slot. The length of sleeve 44 is such that it covers the slot 45. At its left hand end the rotatable tube 41 is connected by means of a coupling 46 of any desired construction to the non-rotatable nipple or pipe 47 having communication with a source of compressed air.

According to the method of this invention a ring or roller such as 39 is placed against the face of the magnetic chuck being centered thereon by means of the projected centering pin 40. Then the chuck is energized which of course holds the roller in its centered position against the face thereof, and immediately thereafter the centering pin 40 is retracted by the operator grasping the coupling 46 and moving it toward the left as viewed in Fig. 1. The grinding tool 48 mounted on a turret or rotative support 49 is moved up into operative position by sliding said turret on its ways 50, the path of the tool being truly parallel to the axis of rotation of the chuck. The tool 48 is for the purpose of finishing the bore of the roller 39. In order to finish the periphery of the roller, a tool 51 is provided and mounted on the turret 49 in such position that when the turret is turned substantially 90° the tool will be brought to a position where it may operate on the periphery of the roller. In order to securely hold the turret in either of the two positions for the operation of one or the other of the tools 48 and 51 a catch or lock 52 of any desired construction may be provided. It will be apparent that the boss 33, which is of smaller diameter than the roller to be finished, is provided so that the roller will be held in a position such that the tool 51 may move across its periphery. In a machine where it is only desired to finish the bore of the rollers, of course the boss would not be necessary.

In order to keep the bore 34 of the chuck free from dust, air under pressure is conducted to the bore through the tube 41 and centering pin 40. The dust may be blown out of the bore directly or through the radial ducts 53 formed in the base of the member 24 leading from the bore to the periphery of the chuck, the inner ends of these ducts opening into the bore in advance of the retracted postion of the centering pin.

It is apparent from the foregoing description that the present invention provides an exceedingly simple and accurate method of finishing the peripheries of a hollow roller by centering one face of the roller against the face of a chuck which is truly perpendicular to its axis, the centering operation being accomplished by retractable means engaging one of the surfaces to be finished.

Although a specific machine has been described it is to be understood that changes may be made within the scope of the appended claims without departing from the spirit of the invention.

Having thus described my invention what is claimed as new and desired to be secured by Letters Patent is:

1. A metal working machine including in combination, a magnetic chuck having a central bore and a face truly perpendicular to the axis of said bore and formed with a radial duct adjacent said face leading from the bore to the periphery of the chuck, a hollow centering pin slidably mounted in said bore and means for supplying air to said pin.

2. A metal working machine including in combination, a supporting bracket, a tube rotatably mounted in said bracket having a driving pulley and a magnetic chuck on one end, said chuck formed with a central bore aligned with said tube and having a radial air duct leading from said bore to the periphery of the chuck and a hollow centering pin slidably mounted in said tube and bore and having connections to a supply of air under pressure.

3. A machine for grinding the bores of hollow cylindrical rollers including in combination, a magnetic chuck having a true flat face perpendicular to its axis, a centering pin concentric with the axis of the chuck slidably mounted to be projected from the said face to engage the bore of a roller and center the same and then be retracted to leave the bore of the roller unobstructed and free to be finished, and means adapted to be actuated to so operate said pin.

In testimony whereof I affix my signature.

LE ROY E. JOLLS.